United States Patent [19]

Brundrett et al.

[11] 4,409,925

[45] Oct. 18, 1983

[54] ABSORBENT MATERIAL

[75] Inventors: Ewart Brundrett, Baden; Franklin T. Carter, Waterloo, both of Canada

[73] Assignee: Thermaster Inc., Kitchener, Canada

[21] Appl. No.: 317,067

[22] Filed: Nov. 2, 1981

[51] Int. Cl.$^3$ .............................................. A01K 1/015
[52] U.S. Cl. ....................................................... 119/1
[58] Field of Search ............................................ 119/1

[56] References Cited

U.S. PATENT DOCUMENTS

| | | | |
|---|---|---|---|
| 3,636,927 | 1/1972 | Baum | 119/1 |
| 4,163,674 | 8/1979 | Been | 119/1 |
| 4,341,180 | 7/1982 | Cortigene et al. | 119/1 |

*Primary Examiner*—Hugh R. Chamblee
*Attorney, Agent, or Firm*—Sim & McBurney

[57] ABSTRACT

An absorbent material suitable for a wide variety of uses and having the ability to absorb, selectively, water, animal waste, oil, grease and chemicals is based on ground paper. Plaster of Paris is usually present along with one or a combination of other components, dependent on the end use of the product. The product may be provided in a fibrous form or in a granular form. The granular form of the product is produced by dry mixing the components and granulating the dry mixture using droplets of water.

9 Claims, No Drawings

ABSORBENT MATERIAL

FIELD OF INVENTION

The present invention relates to absorbent materials, particularly to absorbent materials which are based on ground paper.

BACKGROUND TO THE INVENTION

Absorbent materials in granular form are used for a variety of industrial and household purposes. Typical uses include the absorption of oil, grease and chemicals on floors and elsewhere, in animal toilet applications as a cat box absorbent, as carriers for chemicals, such as, pesticides and herbicides, in various agricultural and horticultural application, and as ground cover.

Such materials have heretofore almost exclusively consisted of absorbent clay granules, such as Fullers earth, although more recently it has been suggested in U.S. Pat. No. 4,163,674 to utilize gypsum, in the form of Plaster of Paris, as a base for granular absorbent materials. The product is formed in this prior art patent by forming a paste or slurry of the gypsum, which may also contain additives, such as finely divided paper, setting and hardening, and then grinding and crushing the dried material to granular form.

The granular product produced by this procedure consists mainly of gypsum and may contain only up to 20% by weight of the gypsum of other additives. The formation of a paste or slurry of the gypsum is essential in this prior art procedure, so that considerable energy is required to dry the product.

SUMMARY OF INVENTION

In accordance with the present invention, there is provided a granular and/or fibrous absorbent material which is based on ground paper and which optionally may contain Plaster of Paris and/or other fillers and additives. The ratio of components in the composition depend on the end use desired for the product, which may include any of those end uses for which granular absorbent materials have traditionally been used.

The product of the invention in its granular form is produced by a unique procedure wherein a dry mix of the components of the product is initially formed and then is granulated by contact with droplets of water. The resulting product may be used as such or may be dried to a lesser moisture content, depending on the desired end use.

The product which is provided by this invention is highly absorbent, typically possessing about 3 to 4 times the absorbency of conventional clay products on a volume basis. The product is obtained using relatively inexpensive materials with little or no waste and with a much decreased energy consumption, when compared with the product of U.S. Pat. No. 4,163,674. The product is biodegradable and utilizes a renewable resource.

GENERAL DESCRIPTION OF INVENTION

As mentioned previously, the present invention essentially requires the use of ground paper material. Any available source of paper may be used to form the ground paper, for example, newsprint, cardboard, clay-loaded paper and office stationary. The ground paper may be provided into its particulate fibrous form from waste material or from unused paper material and usually has a particle size from about 3 mm to about 20 mm.

The utilization of other optional components with the ground paper depends on the intended use of the end product. One optional component is Plaster of Paris, i.e., the chemical having the formula $CaSO_4.\frac{1}{2}H_2O$. Other optional components include, sand, fertilizer, colourants, oil, deodorizers, and detergents.

The various components in their chosen relative proportions are dry-mixed to a homogeneous consistency by any convenient dry mixing technique, for example, utilizing a ribbon or screw type mixer. The relative proportions of the various components depend on the intended end use of the products. The weight ratio of the components ground paper: Plaster of Paris: other components usually is in the range of 1:0:0 to 1:2:1. For example, for the formation of a product useful as a cat box absorbent, a typical weight ratio is 1:0.2:trace (with the other component taking the form of commercially-available deodorant materials).

The dry mixed material may be oil treated to provide a product which absorbs oil selectively and rejects water. In this product, the ground paper is in fibrous form. A detergent may also be incorporated into this product in varying proportions. Greater quantities of detergent render the mixture more water-soluble. Greater quantities of oil render the mixture more oil selective.

The dry mixed material, when not oil treated, is contacted with discrete droplets of water, which may also contain a small amount of wetting agents, if desired, at a controlled rate of application. The water droplets usually have a diameter in the range of about 0.1 to about 5 mm and preferably about 1 to 2 mm. The application of the water droplets causes the formation of granular particles from the dry mixed material.

Usually water is used in a weight ratio to dry mixed material in the range of about 0.5:1 to about 2:1. Below the weight ratio of 0.5:1, a large percentage of fluffy dry material remains which must be recycled while, above the the weight ratio of 2:1, additional water is wasteful, increases the evaporative load and often leads to loss of integrity of the granules. Preferably, the weight ratio of water to dry mixed material is about 1.0:1.

The degree of mixing which is applied to the damp granules which result from the water application step determines the density and shape of the particles which are formed. Shorter periods of mixing from lower density plate-like particles, while longer periods of mixing form more dense and sphere-like particles. The density and shape of product which is formed depends largely on the desired end use of the product.

The density of product which is produced also is dependent to some extent on the size of droplet in the water spray, smaller droplets tending to form lighter products while larger droplets tending to form heavier products. The density of product produced in all cases is significantly lighter than clay absorbents, the actual density varying depending on the intended end use of the product. Usually, the density varies from about 2 to about 20 lb/cu.ft., product at the lower end of the density scale being useful as thermal insulation products while products at the higher end of the density scale are useful as floor cleaning materials. Products of intermediate to higher density, such as about 10 to 20 lb/cu.ft. are useful as animal box absorbents.

The damp granular material resulting from the water treatment step may be bagged as such for use as a garden mulch or as a general ground cover. Alternatively, the damp granular material may be dried to a lower moisture level, usually below about 20% by weight and typically about 10 to about 15 wt.%. The drying operation may be commenced immediately following completion of the mixing step, or may be deferred to permit Plaster of Paris, if present, to be fully or partially hydrated. Fully hydrated Plaster of Paris (i.e., Ca-SO$_4$.2H$_2$0) is often preferred when the granular product is to be used for oil absorption from shop floors and the like while partially hydrated Plaster of Paris is often preferred when the granular product is to be used in cat or other animal boxes, since it possesses sanitizing properties in this form.

The dried granular material is classified, such as by sieving or by using an air flow separator, to provide granules of a size range desired for the intended end use of the product. Fines usually are recycled to the dry mixing step while coarse particles may be crushed to the particle size desired for end use or the crushed material may be recycled to the dry mixing step. The fines also may be used as filler material in cellulosic insulation.

The essential use of ground paper in the product of this invention provides a high absorbency of a variety of liquid materials, typically about 3 to 4 times the absorbency (as determined by volume pick-up) of clay materials. At the same time, this substantially increased absorbency is attained at densities which are considerably less (typically about ⅓rd) than those of clay products. The products of the invention maintain a satisfactory granular form in use and do not tend to powder, create dust or otherwise degrade.

One particularly useful application of the product of the invention is an absorbent in animal boxes. The product has a lower density and greater absorbency than existing clay products, and is readily disposed of when used, in that the product is capable of ready passage through existing sewer lines of homes and municipalities and is biodegradable.

As will be seen from the above description of the invention, the procedure for formation of granular material does not involve the formation of a slurry in water and only minimal drying since granules are formed directly in the water application step. This procedure contrasts with that of U.S. Pat. No. 4,163,674. In addition, the present invention essentially requires the presence of ground paper, in all cases greater than about 25% by weight of the final product (on a dry weight basis). In contrast, in the product of U.S. Pat. No. 4,163,674, ground paper is an optional component which is never present in more than 20% by weight of the product (on a dry weight basis).

EXAMPLES

Samples of granular product were formed utilizing varying proportions of ground clay paper (i.e., magazine stock), Plaster of Paris and water. The ground clay paper of 6 mm mesh size was dry mixed with Plaster of Paris in a conventional mortar mixer for one minute to form an intimate admixture of the components.

Water droplets of 1 mm size were sprayed onto the mixture over a period of two minutes to form granules. Mixing was continued for a further two minutes to form substantially spherical granules. The granules were dried to a moisture content of about 15 wt.% by heating in a stream of hot air at a temperature of about 60° C. for about 100 minutes.

The components of the products which were prepared are set forth in the following Table I:

TABLE I

| Product No. | Components |  |  |
|---|---|---|---|
|  | Clay Paper | Plaster of Paris (oz) | Water |
| 1 | 10 | 0 | 17 |
| 2 | 10 | 1 | 17 |
| 3 | 10 | 3 | 18 |
| 4 | 10 | 5 | 20 |
| 5 | 10 | 0 | 9* |

*Note:
The water included half a cup of detergent.

The products in each case were tested for density, water absorbency and oil absorbency and compared with the properties of proprietary clay product known as "Oil-Dri". The results of the water absorbency tests are set forth in Table II while those for the oil absorbency tests are set forth in Table III:

TABLE II

| Product | Water Absorbency Tests |  |  |  |
|---|---|---|---|---|
|  | Density (lb/ft$^3$) | Quantity of Product (oz) | Quantity of Water Absorbed (oz) | Wt. Ratio of Product:Water (Surface Damp Product) |
| 1 | 10.6 | 5 | 10 | 2:1 |
| 2 | 10.6 | 6 | 10 | 1.67:1 |
| 3 | 12.2 | 5 | 8 | 1.6:1 |
| 4 | 12.6 | 8 | 13 | 1.6:1 |
| Oil-Dri | 32.4 | 16 | 8 | 0.5:1 |

TABLE III

| Product | Oil Absorbency Tests |  |  |  |
|---|---|---|---|---|
|  | Density (lb/ft$^3$) | Quantity of Product (oz) | Quantity of Oil Absorbed (oz) | Wt. Ratio of Product:Oil (Surface damp Product) |
| 1 | 10.6 | 8 | 10 | 1.25:1 |
| 2 | 10.6 | 8 | 9 | 1.12:1 |
| 3 | 12.2 | 8 | 8 | 1:1 |
| 4 | 12.6 | 8 | 8 | 1:1 |
| Oil-Dri | 32.4 | 16 | 4 | 0.25:1 |

It will be seen from the results set forth in Tables II and III that the product of the invention exhibits considerably greater water and oil absorbency than the clay-based product and further has a considerably lower density than the clay-based product.

SUMMARY OF DISCLOSURE

In summary of this disclosure, the present invention provides a novel granular and/or fibrous absorbent material having a wide variety of end uses and which is based on ground paper. Modifications are possible within the scope of this invention.

What I claim is:

1. A granular absorbent material having a density of about 2 to about 20 lb/cu.ft., comprising ground paper, Plaster of Paris and at least one other component in the weight ratio 1:0.01:0.01 to about 1:2:1 which has been granulated utilizing water droplets, said other component being selected from the group consisting of sand, fertilizer, colorants, oil and deodorants.

2. The product of claim 1 having a moisture content of less than about 20 weight percent.

3. The product of claim 1 having a density of about 10 to 20 lb/cu.ft.

4. A granular absorbent material useful as an animal box absorbent, comprising ground paper, Plaster of Paris and deodorant in the weight ratio of 1:0.01:0.01 to 1:0.7:trace granulated with water droplets, having a moisture content of less than about 20 wt.% and having a density of about 10 to 13 lbs/cu.ft.

5. The product of claim 1, 2 or 4 which is biodegradable.

6. An absorbent material comprising ground paper in fibrous form, Plaster of Paris and oil mixed in the weight ratio of 1:0.01:trace to 1:2:1.

7. A method for the manufacture of a granular lightweight absorbent material, which comprises dry mixing ground paper, Plaster of Paris and at least one additional component in the weight ratio of 1:0.01:0.01 to about 1:2:1 to form a homogeneous mixture, spray applying water droplets of diameter from about 0.1 to about 5 mm to the homogeneous mixture in a weight ratio of water to mixture of about 0.5:1 to about 2:1, mixing said water and mixture to form discrete particles, and drying the particles to a moisture content of less than about 20 wt.%.

8. The method of claim 7 wherein said water is utilized in a weight ratio of about 1.0 to 1.

9. The method of claim 7 or 8 wherein said water droplets have a diameter of about 1 to 2 mm.

* * * * *